United States Patent [19]
Weinberg et al.

[11] Patent Number: 5,207,877
[45] Date of Patent: May 4, 1993

[54] METHODS FOR PURIFICATION OF AIR

[75] Inventors: Norman L. Weinberg, Amherst; John D. Genders, Lancaster; Alfred O. Minklei, Grand Island, all of N.Y.

[73] Assignee: Electrocinerator Technologies, Inc., Lancaster, N.Y.

[21] Appl. No.: 670,885

[22] Filed: Mar. 18, 1991

Related U.S. Application Data

[63] Continuation-in-part of Ser. No. 138,441, Dec. 28, 1987, Pat. No. 5,009,869.

[51] Int. Cl.⁵ .............................................. B01D 53/00
[52] U.S. Cl. .................................... 204/130; 204/131; 204/149; 423/210
[58] Field of Search ................ 204/149, 130, 131; 423/210

[56] References Cited

U.S. PATENT DOCUMENTS

| | | | |
|---|---|---|---|
| 3,616,339 | 10/1971 | Marzluff | 204/130 |
| 3,725,226 | 4/1973 | Stoner | 204/149 |
| 3,755,130 | 8/1973 | Zabolotny | 204/275 |
| 3,793,171 | 2/1974 | Zabolotny et al. | 204/130 |
| 3,911,080 | 10/1975 | Mehl et al. | 423/210 |
| 3,975,246 | 8/1976 | Eibl et al. | 204/151 |
| 4,004,993 | 1/1977 | Horner et al. | 204/131 |
| 4,048,044 | 9/1977 | Eibl et al. | 204/257 |
| 4,422,917 | 12/1983 | Hayfield | 204/196 |
| 4,426,364 | 1/1984 | Cooper | 423/235 |
| 4,643,886 | 2/1987 | Chang et al. | 423/226 |
| 4,874,485 | 10/1989 | Steele | 204/130 |
| 4,936,970 | 6/1990 | Weinberg et al. | 204/242 |
| 5,009,869 | 4/1991 | Weinberg et al. | 423/210 |

Primary Examiner—John Niebling
Assistant Examiner—Arun S. Phasge
Attorney, Agent, or Firm—Howard M. Ellis

[57] ABSTRACT

Air polluted with potentially harmful chemical and biological matter is purified and pollutants degraded to less hazardous substances by a combined chemical and electrochemical process. Scrubber liquid-electrolyte circulated between scrubber and electrolyzer zones containing an electrochemically renewable degradant complexes or oxidizes the pollutants with the aid of an electrochemical cell in the electrolyzer zone which also reactivates the degradant in the scrubber liquid for recycling. Adsorption of insoluble organics is enhanced by stable surfactant additives to the scrubber liquid-electrolyte. Surprisingly, the electrochemical cell performs efficiently without separators or membranes when the non-working cathodes comprise Magneli phase substoichiometric titanium oxides which preferentially generate hydrogen instead of reducing redox couples to their inactive lower valence state.

28 Claims, 1 Drawing Sheet

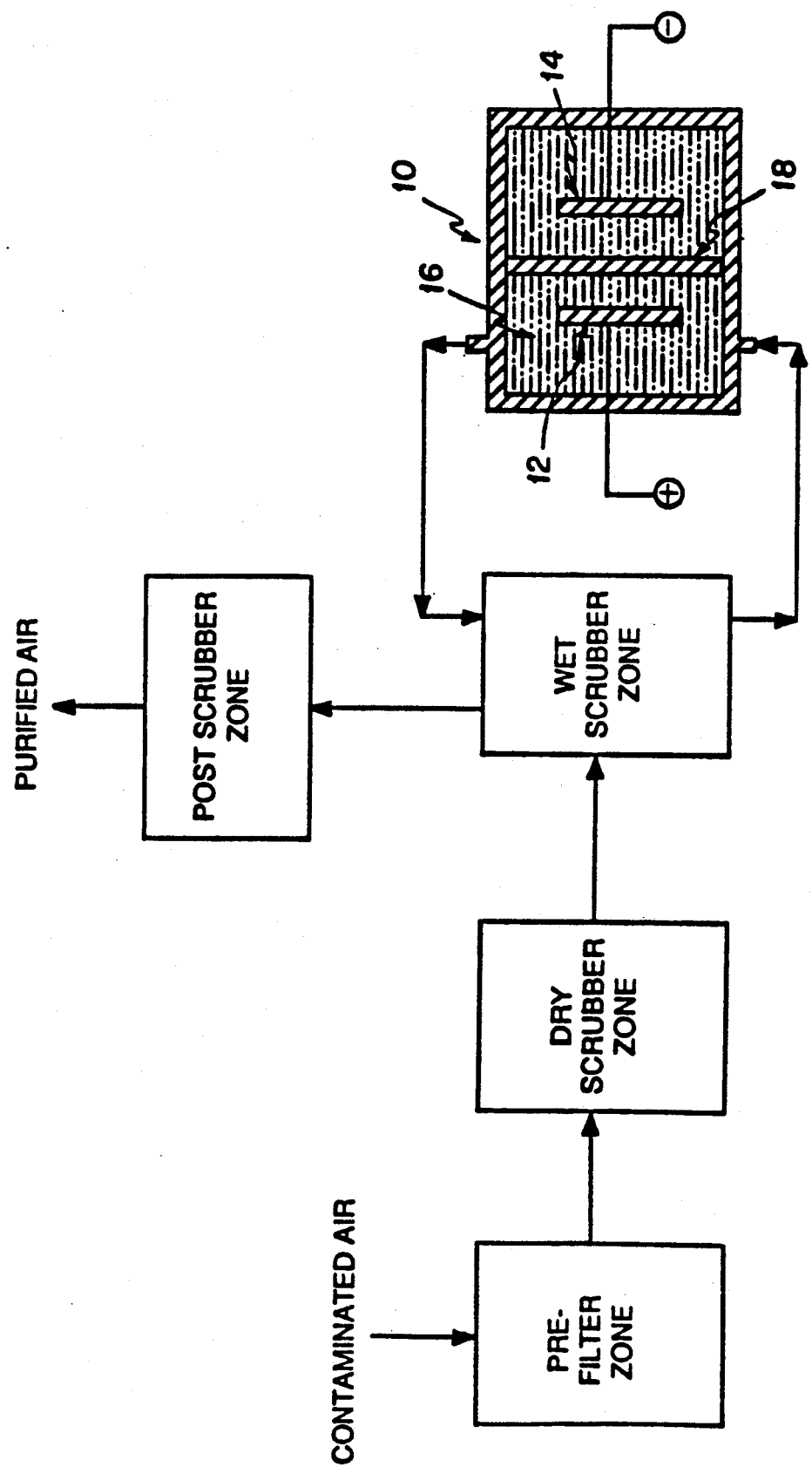

METHODS FOR PURIFICATION OF AIR

This invention was made with government support under contract No. F04704-86-C-0090, awarded by the Department of Defense. The Government has certain rights in this invention.

CROSS REFERENCE TO RELATED APPLICATION

This application is a continuation-in-part of Ser. No. 138,441, filed Dec. 28, 1987, now U.S. Pat. No. 5,009,869.

BACKGROUND OF THE INVENTION

This invention relates generally to improved methods for efficient purification of gases, and more specifically, to methods for both effectively purifying air and simultaneously destroying most potentially harmful airborne chemicals, microorganisms and other biologicals by both chemical and electrochemical means.

Modern society is facing a major problem of increased pollution of the air we breathe in the work environment, homes, hospitals, public buildings and vehicles, caused by a variety of toxic, volatile, and often malodorous and irritating chemicals, as well as potentially dangerous microorganisms, such as viruses, bacteria, molds, yeasts, spores and other pathogens. In the industrial environment, toxic, hazardous, or contaminating chemical vapors, such as formaldehyde, benzene, chloroform, etc., have come under strict government regulation; however, instantaneous worker exposure can be high in case of a spill and often there is little or no provision for rapid removal of such substances from the air to an acceptably low level. Moreover, there often is an accumulation of these airborne pollutants in the vicinity of chemical plants, food processing operations, sewage treatment plant and utilities. Signficant or even larger contaminant or pollutant levels can occur indoors because of tightly enclosed, more energy efficient buildings. For hospitals, the continued use of ethylene oxide as a disinfectant has created concern, but an even more immediate danger is the large number of annual mortalities caused by hospital infections. Likewise, air-conditioning units in large buildings have been associated with deadly "Legionnaires Disease".

Kirk-Othmer, 3rd. Edition, Vol. 1, p 653 (Wiley Interscience) lists a variety of methods for removal of pollutant in air, including adsorption, e.g. in activated carbons, absorption in solution, filtration, coagulation, electrostatic precipitation, incineration, chemical reaction, condensation, etc. However, many of these methods cannot readily remove very tiny particles, such as gas molecules and smaller microorganisms.

Absorption of toxic gases by water or aqueous solution, such as HCl, HF, $NH_3$, $Cl_2$, $H_2S$, amines, etc., can be very effective. Likewise, many of these gases, as well as microorganisms, can be removed effectively by adsorption onto solid surfaces, particularly activated carbon. Absorption, adsorption, filtration, coagulation and electrostatic precipitation are physical methods of decontamination. Physical methods are of special interest where recovery of chemicals is desirable economically.

Chemical methods of decontamination include reactions of toxic or hazardous substances with such oxidizing agents as chlorine, chlorine dioxide, hypochlorite, ozone, peroxide or reducing agents such as dithionite, noble metal catalysts and hydrogen, metallic sodium, etc.

Both physical and chemical methods have certain drawbacks however. For example, in situations where it is not desirable to recover airborne chemicals for reuse, the problems of disposal still exists. Also, physical techniques suffer from "saturation" related dangers. For example, in a hospital or "clean-room" situation, carbon-based filters or cartridges can become saturated to the point where no further removal occurs or where dangerous desorption takes place. In contrast, chemical methods often require use of reagents which are themselves quite toxic and often have problems of byproduct disposal. Other methods, such as incineration can be uneconomical or even illegal in certain areas.

In an effort to overcome some of the shortcomings previously noted, electrochemical methods have been tried. For example, U.S. Pat. No. 3,725,226 (Stoner) describes an electrochemical device with graphite electrodes. Pathogens in water are destroyed by periodically reversing DC current. Stoner fails to address the problems associated with air purification, including means for removing harmful substances from air like organic chemicals and their destruction. French Patent 1,538,901 (Marzluff et al) teaches air purification means capable of destroying a wide range of volatile chemicals, including aldehydes, alcohols, esters and others. Metal oxide anodes, such as lead dioxide and porous air cathodes containing carbon are employed in an electrochemical cell separated by glass wool impregnated with sulfuric acid. Both the Stoner and Marzluff et al patents fail to disclose an effective method for scrubbing toxic airborne substances from air. Moreover, Marzluff et al's electrochemical cell requires the airborne components contact the electrode before destruction of the pollutant can occur placing a severe limitation on mass transport on their apparatus and rate of degradation, especially for contaminants present in air at lower, but still dangerous levels of concentration. Marzluff et al do not utilize a regeneratable electrolyte for further chemical reaction with pollutants.

Methods have also been developed for the removal of toxic and environmentally unacceptable emissions from utilities and from sour gas, usually with the objective of making a useful chemical, instead of forming an essentially innocuous by-product. For instance, U.S. Pat. No. 4,426,364 (Cooper) discloses a process for removing nitrogen oxides and $SO_2$ from gas mixtures including air, by contacting the gas mixture in a scrubber with an aqueous solution of an acid and an oxidizing agent, such as peroxide or persulfate in which nitric and sulfuric acids are formed for recovery. U.S. Pat. No. 4,643,886 (Chang et al) discloses a process for removal of $H_2S$ from sour gas, which is largely methane, comprising contacting the sour gas stream with an aqueous alkaline solution at a temperature below the melting point of the product, namely sulfur. The aqueous solution comprises at least one polyvalent metal chelate in a higher valence state in an effective amount suitable for oxidizing all the $H_2S$ to recoverable sulfur. The inactive form of the polyvalent metal chelate is regenerated anodically in an electrochemical cell, and the solution recycled to the contact zone. The process of Chang et al is conducted under conditions which favor the formation of elemental sulfur for recovery, instead of minimizing or avoiding the production of by-products requiring separation, purification or disposal, or which are consumed by the process, in-situ.

A further representative example of an electrochemically based system is that from Pacific Engineering & Production Co. (Henderson, Nevada) under the trademark, Odormaster. This apparatus, used to eliminate odors in sewage and industrial plants, utilizes an electrochemically generated aqueous sodium hypochlorite solution which circulates through a scrubber. This technology removes the mass transport limitation noted above with the Marzluff et al process, by providing a large reservoir of an oxidizing agent to destroy malodorous components. However, a serious limitation exists in the Pacific Engineering approach in that many kinds of organic compounds, such as olefins and aromatic hydrocarbons will be chlorinated should they enter the electrochemical cell. As a general rule, chlorinated hydrocarbons are more toxic than the parent hydrocarbon, and furthermore, are usually more difficult to destroy by oxidation, as for example, polychlorinated biphenyls.

U.S. Pat. Nos. 3,975,246 and 4,048,044 (Eibl et al) disclose electrochemical means for purifying water contaminated with microorganisms. In the later patent, water is disinfected by an oxidation process at the anode without disinfectant additives. The former patent also relies on anodic disinfection, but also requires chloride, hydroxide, carbonate, etc., in the cathode compartment in concentrations exceeding those in the treated water. Both Eibl et al patent rely principally on electrochemical means for disinfection, and consequently, the scope of contaminants and toxic substances which can be destroyed is limited.

Further representative examples of electrochemical means for purification of air are disclosed in U.S. Pat. No. 3,911,080 (Mehl et al) and U.S. Pat. No. 3,793,171 (Zabolotny et al). U.S. Pat. No. 3,911,080 discloses a process for treating polluted air in an electrolyte containing a metal ion which can be circulated between modules in an air duct and an electrochemical cell. According to Mehl et al spent electrolyte is renewed in a separator/membrane equipped electrochemical cell. The separator/membranes, however, have numerous shortcomings, including increased operating costs due to internal resistance (iR) across the separator resulting in higher power consumption; also larger inter-electrode gaps to accommodate member leading to higher solution iR and increased power consumption. Electrolytic cells equipped with membranes also mean increased capital costs due in part to the membrane itself and added pumping equipment, as well as requiring more complex, and therefore, more costly cell designs. Membrane/separator equipped cells also mean higher cost as a result of more frequent downtime due to fouling and mechanical and chemical instabilities of the separators to aggressive environments. Hence, it would be highly desirable to be able to purify air electrochemically, but without the usual membrane/separator equipped cell.

Previous attempts to remove the electrolytic cell membrane have lead to poor current efficiencies in the regeneration of redox reagents used in the destruction of pollutants. For example, instead of the competing process of cathodic hydrogen evolution occurring at the cathode the desired oxidized specie of the metal ion redox couple needed for further oxidation of pollutants becomes readily reduced at the cathode. One method of solving this problem according to U.S. Pat. No. 3,793,171 (Zabolotny et al) is to employ an anode having substantially greater surface area than the cathode. Zabolotny et al suggest an anode to cathode surface area ratio of 20:1. While this method would tend to favor hydrogen evolution at the cathode over the reduction of the higher valence state metal ions in the electrolyte, a substantially smaller surface area electrode (cathode) relative to the anode requires a more complex cell design and higher capital costs. Moreover, an anode having a larger surface area than the opposing cathode in a parallel plate cell results in uneven current distribution across the face of the anode. While a cathode having a surface area equal to that of the anode can be used and portions of the cathode masked this is quite uneconomic in terms of capital and operating costs. Accordingly, it would be desirable to eliminate separators from electrochemical cells in the purification of air, especially when employing reducible metal ions in the electrolyte which are subject to valence changes at the counter electrode.

Previous electrochemical methods for purification of air have had other significant shortcomings. For instance, U.S. Pat. Nos. 3,911,080 and 3,793,171 fail to recognize the solubility problem of certain airborne pollutants, such as aromatic hydrocarbons which are not readily absorbed and solubilized by the scrubber-liquid electrolytes. That is, unless a broad spectrum of pollutants are sufficiently soluble in the scrubber-liquid electrolyte solution the purification method will be ineffective in removing and breaking down the pollutants to substances of lesser toxicity.

Accordingly, it would be desirable to have improved electrochemical methods for purifying air and other gases, including means for separating and destroying a broader range of potentially toxic airborne chemicals and microorganisms recovered therefrom, by combining both chemical and electrochemical methods.

SUMMARY OF THE INVENTION

It is, therefore, a principal object of this invention to provide a method for removing and destroying a much wider range of toxic and hazardous airborne chemicals and biological substances than previous processes, including organics like unsaturated hydrocarbons, aromatic hydrocarbon solvents like benzene, methanol and benzyl alcohol, esters like methyl formate and ethyl acetate, amines like ammonia and the alkyl and aryl substituted amines, sulfur compounds like $H_2S$, $SO_2$ and mercaptans, ketones like acetone and 2-butanone, cyanides like hydrogen cyanide and acetonitrile, ethers like diethyl ether, methyl t-butyl ether, and chloromethyl ether, as well as other volatile toxic hazardous compounds containing functionalities comprising elements like C,H,N,S,P,Cl,Br,I,F,O, elemental and organically bound Hg, Cd, Pb, Sb, V and the like, as well as mixtures of compounds containing such functionalities. Air may also be contaminated by biological substances, including principally airborne microorganisms like bacteria, viruses, fungi, yeasts, and the like. Producers of such contaminated air include industry, power generating stations, chemical waste handling, sewage treatment plants and composting operations, disposal and storage sites, hospitals, homes, office buildings, vehicles, breweries, and food processing plants. For purposes of this invention, air and its treatment is intended to means ambient air, indoors or outdoors for inhalation or respiration in a biological system, and is intended to exclude the direction treatment of process gases and gaseous fuels, e.g. methane. However, the process is intended to treat ambient air which may having become polluted by these sources, such that the resultant purified air is safe and meets government standards.

The processes for purification of air and destruction of pollutants generally includes the steps of: (a) Providing an air purification system having a scrubber zone in combination with an electrolyzer zone, and an aqueous scrubber liquid-electrolyte circulating between the electrolyzer and scrubber zones. The scrubber liquid-electrolyte contains an "electrochemically regeneratable degradant" defined below, and in some instances, a nonvolatile pollutant solubilzing agent. (b) The polluted air is cleaned by dissolving pollutants into the scrubber liquid-electrolyte and impressing a voltage across the electrochemical cell. (C) The pollutant(s) in the scrubber liquid-electrolyte are converted to substances of lesser toxicity or hazard, and (d) the electrochemically regeneratable degradant in the scrubber liquid-electrolyte is then reactivated for further cleaning of polluted air.

The nonvolatile pollutant solubilizing agent is preferably a substance which is at least partially soluble, but may be an insoluble oil or a solid adsorbent in the scrubber liquid-electrolyte and is stable to electrolysis and chemical oxidation reactions.

It is a further principal object of the invention to provide for a method of treating air at higher throughput rates than previous methods, including the purification of air having relatively low levels of toxic substances without generating by-products, such as halogenated compounds which can create dangerous health risks.

It is also a principal object of the present invention to provide for a process which minimizes the formation of by-products which cannot be used in the process itself, or which minimizes the generation of bulk quantities of chemical by-products so as not to present separation, purification or disposal problems.

It is yet an additional object of this invention to provide various means for carrying out the methods herein described, including certain novel devices for practicing the methods. This includes improved electrochemical cells for destruction of pollutants dissolved in the scrubber liquid-electrolyte and/or for renewing electrochemically, spent scrubber liquid-electrolyte for recycling and continuous operation, which also minimizes waste disposal problems. The methods of the invention are improved from a further aspect in that the devices employed are no longer dependent on electrochemical cell membranes o dividers in the electrolyzer zone for separating cell anode and cathode compartments to prevent mixing of anolyte and catholyte where, for example, metal ions in the anolyte/scrubber liquid would otherwise undergo unwanted valence changes at the counter electrode (cathode) during renewal.

Accordingly, it is a further principal object to provide a method for purification of air and destruction of pollutants by the steps of: (a) providing an air purification system having a scrubber zone in combination with an electrolyzer zone. A scrubber liquid-electrolyte circulates between the electrolyzer and scrubber zones and includes an "electrochemically regeneratable degradant". Preferably, the electrolyzer zone is an undivided electrochemical cell having an anode as a working electrode and a cathode comprising a substoichiometric titanium oxide as the non-working counter electrode. The performance of the counter electrode may be characterized as suitable for preferentially generating hydrogen by electrolysis of water while desirably minimizing reduction of the electrochemically regeneratable degradant. (b) The air is cleaned by sorption of the pollutants(s) by the scrubber liquid electrolyte which pollutant are then degraded to substances of lesser toxicity by chemical reaction with the electrochemically regeneratable degradant and/or by electrochemical means at the anode. This is achieved by impressing a voltage across the electrochemical cell. (c) The process thus includes the step of converting the pollutants removed from the air to less hazardous substances. (d) In conducting the purification process the electrochemically regeneratable degradant i renewed/-reactivated electrochemically at the working electrode and recycled back to the scrubber zone for further cleaning of air and destruction of pollutants with minimal reduction of the reactivated degradant occurring at the counter electrode.

For purposes of the present invention the expression "electrochemically regeneratable degradant" is intended to mean ions, either metals or nonmetals, which when in an active state are capable of forming soluble complexes with pollutants sorbed by the scrubber liquid-electrolyte which can then be destroyed/degraded electrochemically to substances of lesser toxicity or hazard, e.g. carbon dioxide and water, in the electrolyzer zone. The ions in this first group which perform by this mechanism are generally referred to herein as "complexing metal ions".

Electrochemically regeneratable degradant is a generic expression intended to also include ions having multivalent states, i.e. redox couples, such as $Cr^{+3}/Cr^{+6}$, that when in a higher oxidized active state will react chemically with pollutants sorbed by the scrubber liquid electrolyte, and in so doing form substances of lesser toxicity or hazard. Although not wishing to be held to any specific mechanism of action, nevertheless it is believed that the multivalent ions, i.e. redox couples, when in a higher active valence state chemically solvolyze, degrade, oxidize, destroy, or otherwise chemically modify the pollutants. In the process of reacting with a pollutant the higher valence state redox couple is reduced to its lower inactive valence state. The scrubber liquid-electrolyte containing the spent redox couple is then reactivated back to its higher oxidized active valence state at the anode of the electrolyzer zone. The reactivation of the scrubber liquid-electrolyte also provides an important back-up system for degrading any residual pollutant not destroyed during the initial chemical destruction phase.

Thus, the expression "electrochemically regeneratable degradant" includes both complexing metal ions and redox couples, wherein the former appears to complex with pollutants without degrading or modifying their properties in the process. In contrast, multivalent ion redox couples usually chemically react with and in the process degrade the pollutant when the ions are in a higher active valence state. Accordingly, expressions like redox couple and complexing metal ion do not denote clearly defined and mutually exclusive groups of ions, but more accurately mechanisms of action. In other words, for purposes of this invention it is possible for some of the same ions to perform as complexing metal ions and also as redox couples. For example, cobalt and silver both have multivalent states, and when in a higher valence state may be capable of chemically oxidizing pollutants to degrade them, and thereby act as redox couples. Likewise, silver and cobalt may not have higher valence or oxidizing states under particular process conditions, and instead of oxidizing pollutants they will form soluble complexes with the pollutants which can be degraded electrochemically in the electrolyzer zone, in which case they are performing more as complexing metal ions.

A further example would be chromium. One pathway of destruction may include $Cr^{+6}$ which in its higher valence state is capable of forming soluble complexes, for instance, with an amine pollutant which complexed pollutant can undergo anodic oxidation to release $Cr^{+6}$ and amine degradation products. To this point, the $Cr^{+6}$ is performing as a complexing metal ion. The $Cr^{+6}$ can then react by chemical oxidation with the amine degradation products and form $Cr^{+3}$ and oxidation products. The $Cr^{+3}$ can then be regenerated electrochemically to $Cr^{+6}$ anodically, thereby making it available for repeating the cycle. Under these latter circumstances, the same $Cr^{+6}$ is functioning as a redox couple.

A still further principal object of the invention is to provide a method for enhanced chemical and electrochemical purification of air employing one or more electrochemically regeneratable degradants. This would include methods for purification of air and destruction of pollutants by the steps of: (a) providing an air purification system having a scrubber zone in combination with an electrolyzer zone, and a scrubber liquid-electrolyte circulating between the electrolyzer and scrubber zones. The scrubber liquid electrolyte which has at least one complexing metal ion lacks a higher oxidation state under process conditions, and is capable of enhancing dissolution of the pollutants in the scrubber liquid-electrolyte when in a reactive state by forming complexes therewith. (b) Pollutants are removed from the air by dissolving in the scrubber liquid-electrolyte and forms complexes with the complexing metal ion. (c) The complexed pollutants are converted electrochemically in the electrolyzer zone to substances of lesser toxicity or hazard while releasing the complexing metal ions back to the reactive state. (d) The scrubber liquid-electrolyte with complexing metal ion in an active state can then be returned to the scrubber zone for further cleaning of polluted air.

A still further object of the invention is to provide a method for chemical and electrochemical purification of air employing combinations of electrochemically regeneratable degradants by the steps of: (a) providing an air purification system with a scrubber zone in combination with an electrolyzer zone, and a scrubber liquid-electrolyte circulating between the electrolyzer and scrubber zones. The performance enhancing combinations of more than one redox couple are selected from the group consisting of $Co^{+3}/Co^{+2}; Cr^6/Cr^{+3}; Ce^{+4}/Ce^{+3}$; $Fe(CN)_6^{-3}/Fe(CN)_6^{-4}$; $Fe^{+3}/Fe^{+2}$; $Mn^{+3}/Mn^{+2}$; $Pb^{+4}/Pb^{+2}$; $VO^+/VO^{+2}$; $MnO_4^-/MnO_2$; $Ag^{+2}/Ag^+$; $S_2O_8^{-2}/SO_4^{-2}$ and non-halogenating concentrations of halide ion. (b) The polluted air is cleaned by dissolving pollutants in the scrubber liquid-electrolyte. (c) The redox couple and pollutants in said scrubber liquid-electrolyte for substances of lesser toxicity or hazard and spent redox couple. (d) The spent redox couple is reactivated in the scrubber liquid-electrolyte in the electrolyzer zone to form reactivated scrubber liquid-electrolyte, and (e) the reactivated scrubber liquid-electrolyte is returned to the scrubber zone for further cleaning of polluted air. For purposes of this invention the expression "performance enhancing combinations" of redox couples is intended to mean any combination of the foregoing redox couples which are capable of providing one or more of the following: reduced power consumption, lower cell voltage, higher current efficiency, increased rate of destruction or more complete destruction of pollutant than could otherwise be achieved by employing any single redox couple alone.

During the chemical phase of the process the active higher valence ions more generally degrade/destroy pollutant(s) and become reduced to a lower valence, i.e. transformed into an—inactive state. The inactivated scrubber liquid-electrolyte then enters the electrochemical phase of the process where any residual untreated pollutant still remaining in the electrolyte is degraded, oxidized or otherwise destroyed in the electrolyzer zone while the lower valence ions, for example, of the redox couples are simultaneously regenerated by oxidizing at the anode back to their higher valence or active state. Similarly, complexing metal ions lacking higher oxidation states under process conditions which form soluble complexes with pollutants, hereinafter also referred to as the —inactive state—, in the scrubber zone are degraded in the electrolyzer zone which also "releases" uncomplexed metal ion, or in other words, transforms them back to their "active state" for further use in the scrubber zone.

Accordingly, the present invention preferably comprises a "closed system" which is intended to mean that it is a continuous recycling chemical and electrochemical process which primarily degrades or destroys recovered toxic and hazardous substances without generating any "useful" by-products for removal and use outside the system, e.g. sulfur, sulfuric acid, phosphoric acid and nitric acid. Thus, a "closed system" means the methods contemplated herein are preferably intended for implementation under conditions which minimize generation of residual by-products which can present troublesome separation, purification or disposal problems. More preferably, any by-products generated during the chemical and electrochemical phases of degrading recovered toxic or hazardous substances are used or consumed in-situ directly in the process.

However, the "closed system" concept is also intended to mean that electrochemically regeneratable degradant for destruction of contaminants, is essentially not irreversibly consumed in the process, but instead, is regenerated and recycled for further use in the chemical phase. However, this is not intended to mean that make-up quantities of degradant and other electrolyte components, e.g., salts, employed in the scrubber liquid or incidental salts and other solids which may form in the system after a period of operation will not have to be added or removed from the system time-to-time.

Although the invention relates to a closed system which preferentially does not generate bulk quantities of by-products for recovery, there are instances where quantities of by-products do build up (e.g. S or $H_2SO_4$ from $H_2S$, or insoluble mercury salts from organomercury pollutants). In these cases, recovery methods generally known in the art involving physical, chemical and electrochemical methods of separation such as filtration, use of ion-exchange resin, dialysis and electrodialysis, etc. may be employed, if required, to avoid excess build up.

As a further alternative embodiment this invention contemplates processes which may optionally include pretreatment of contaminated gases before cleaning in the scrubber zone. They include treating the contaminated air in a prefilter zone for removing macroparticles like dust and flyash. A further optional pretreatment step includes a prescrubber zone for adsorbing larger instantaneous releases of toxic, hazardous or contaminating substances, particularly those exhibiting low water solubility. A still further option is a post treatment zone for fresh water-rinsing of the air leaving the electrolyzer zone, as well as reducing moisture content as final treatment steps before discharging the purified air or gas.

These and other objects, features and advantages of the invention will become more apparent from the detailed written description below. However, for a further understanding of the invention, reference is first made to the accompanying drawing which provides a schematic view of the purification processes.

DESCRIPTION OF THE DRAWING

The drawing provides a block diagram of a preferred embodiment of the invention.

DETAILED DESCRIPTION OF THE INVENTION

In all embodiments of the invention, contaminated air is treated in a wet scrubber zone to clean and separate virtually all chemical and biological pollutants from incoming air. The wet scrubber zone may comprise an efficient wet scrubber containing, for example, a high surface area packing which is inert to the circulating aqueous scrubber liquid-electrolyte described in greater detail hereinbelow. The wet scrubber can be separate from the electrochemical reactor or may be integral with it. Such scrubbers, as separate units, can be of the usual designs, constructed of inert components and available commercially in many configurations and sizes, for effectively contacting the contaminated air and for removing or dissolving toxic substances into the aqueous scrubber liquid-electrolyte. It has been found that a particularly useful scrubber design for the purposes of this invention is provided by bundles of microporous hollow fibers (not shown) of the type manufactured by a number of companies including Celanese Separation Products of Charlotte, N.C., the Raipore Division of RAI Research Corporation, Hauppauge, N.Y. and by Nitto Denko in Japan. These hollow fiber bundles are manufactured of inert polymers, such as polysulfone and polypropylene, and are selected from pore diameters sufficiently large for decontamination of airborne chemicals and pathogens, but not too large such that the aqueous electrolyte circulating on the outside of the hollow fibers, penetrates to the interior of the hollow fibers and is thus swept away.

The scrubber function may also be an integral part of the electrochemical cell design, particularly where one of the electrodes of the cell, 10 is porous, such as for example, a gas diffusion electrode or air cathode design as constructed for use in fuel cells and metal/air batteries. Here, the gas diffusion electrode serves both as the electrode and an effective wet scrubber when contaminated air is contacted with the non-wetted side of such electrodes. Another integrally located wet scrubber configuration comprises inert microporous hollow fiber bundles or an inert packing situated between anode 12 and cathode 14 of electrochemical cell 10 located in aqueous electrolyte 16 in a compartmented cell as illustrated with a separator 18, or uncompartmented cell in the absence of such separator where the contaminated air passes through the inert microporous hollow fiber bundles or bubbled through the inert packing in the aqueous electrolyte. These integral air purifier designs are especially useful where smaller, more compact air purification units are desired, as for example, in portable gas masks and completely enclosed environmental suits.

As illustrated, scrubber liquid-electrolyte 16 in a nonintegral system may preferably be circulated in a loop forming a —closed system—from the anode compartment of cell 10 to the wet scrubber zone where the polluted air is cleaned and chemical and biological contaminants dissolved into the liquid, may be further broken down to products of substantially lesser toxicity or hazard, like carbon dioxide and water. The scrubber liquid-electrolyte provides an effective solubilizing and-/or chemically reactive solution or reagent for efficient removal of contaminants from the gaseous phase. Further, the scrubber liquid-electrolyte serves as an efficient reservoir for collection of both unreacted, but more often at least partially reacted contaminants, which are continually degraded or destroyed in the electrolyzer zone to form substances of lesser toxicity or hazard. Where chemical reaction of the active state of the degradant with the contaminant has occurred, the "inactive" state of the degradant is generated, but this "inactive" state is reconverted to the active form at the anode in the electrolyzer zone.

The scrubber liquid-electrolyte comprises as a principal component at least one—electrochemically regeneratable degradant—previously defined, which can be, for example, a redox couple. Suitable electrochemically regeneratable redox degradants may include any of the known redox couples based on chromium, cerium, vanadium, cobalt, manganese, iron, nickel, silver, etc. and which when in their "active" form i.e. higher valence or higher oxidation state are capable of chemically degrading, destroying and/or disinfecting the pollutant-containing scrubber liquid-electrolyte without generating meaningful amounts of by-products for recovery and use outside the system. Such redox couples must also be capable of being reoxidized to their active form after undergoing reduction by chemical reaction with a contaminant. Suitable redox couples are also intended to include the halogens like chlorine, bromine and iodine, but under conditions and in amounts which are sufficient to disinfect or destroy the chemical or biological pollutants, but without forming potentially more toxic halogenated by-products, e.g. chlorinated hydrocarbons or amines in the process. Accordingly, the expression "electrochemically regeneratable degradant" for purposes of this invention is intended to exclude redox couples which under reaction conditions tend to halogenate, e.g. $Cl_2/Cl^-$, $HOCl/Cl^-$ and the like.

Bard et al in "Standard Potentials In Aqueous Solution" (Marcel Dekker, 1985) list a substantial number of preferred redox couples of sufficiently high oxidation potential which we have found enable destruction of many kinds of contaminants in air. These redox couples include the following specific examples: $Co^{+3}/Co^{+2}$; $Cr_2O_7^{-2}/Cr^{+3}$; $Ce^{+4}/Ce^{+3}$; $Fe(CN)_6^{-4}$ $Fe^{+3}/Fe^{+2}$; $Mn^{+3}/Mn^{+2}$; $Pb^{+4}/Pb^{+2}$; $VO_2^+/VO^{+2}$; $MnO_4^-/MnO_2$; $Ag^{+2}/Ag^+$; $S_2O_8^{-2}/SO_4^{-2}$; $Br_2/Br^-$ etc. $Ag^{+2}/Ag^+$ is an especially useful redox couple because it has one of the highest oxidation potentials of all redox couples, and therefore, is a very powerful oxidant capable of destroying a wide range of airborne pollutants, including more difficultly oxidized pollutants, like hydrocarbons and halogenated organics. $Ag^{+2}/Ag^+$ redox couple is employed in an acid media. The acid performs as a stabilizer for the $Ag^{+2}$, and allows higher concentrations of $Ag^{+2}$ in solution for faster rates of reaction and higher efficiencies. Preferred acids are mineral acids such as sulfuric and nitric acids, and mixtures of the same. $HNO_3$, however, is most preferred.

As a further embodiment of the invention, it has been discovered that the scrubber liquid-electrolyte may contain performance enhancing combinations of more than one redox couple. Representative examples of especially useful redox couples which may be used in combination include $Co^{+3}/Co^{+2}$; $Cr^{+6}/Cr^{+3}$; $Ce^{+4}/Ce^{+3}$; $Fe(CN)_6^{-3}/Fe(CN)_6^{-4}$; $Fe^{+3}/Fe^{+2}$; $Mn^{+3}/Mn^{+2}$; $Pb^{+4}/Pb^{+2}$; $VO^+/VO^{+2}$; $MnO_4^-/MnO_2$; $Ag^{+2}/Ag^+$; $S_2O_8^{-2}/SO_4^{-2}$, and nonhalogenating concentrations of halide ion. While the expression "performance enhancing combinations" concerns accelerating the rate of destruction or more complete destruction of toxic substances absorbed by the scrubber liquid-electrolyte than with one of the same redox couples used alone, it should be understood this expression is not limited to these improvements only. That is, any combination of redox couples capable of improving performance of the process is intended to fall within the broad meaning of the expression "performance enhancing combinations". For instance, any combination of redox couples which will reduce power consumption, lower cell voltage, increase current efficiency, increase the solubility of pollutants in the scrubber liquid-electrolyte, and the like, is intended to fall within the meaning of this expression. Representative examples of specifically useful performance enhancing combinations of redox couples include $Cr^{+6}/Cr^{+3}$ with $Ce^{+4}/Ce^{+3}$; $Cr^{+3}/Cr^{+3}$ with alkali metal halide; $Ce^{+4}/Ce^{+3}$ with alkali metal halide; $Cr^{+6}/Cr^{+3}-Ce^{+4}/Cr^{+3}$—sodium bromide, to name but a few.

As previously indicated, electrochemically regeneratable degradants also include any of the known metal complexing ions which are capable of complexing, solubilizing, and hence removing pollutants from air for destruction principally in the electrolyzer zone. These include metal ions based on copper, nickel, cobalt, silver, palladium, etc., and which are capable of forming soluble complexes with a variety of organics like alcohols, amines, sulfides, carbon monoxide and others. Such complexed and hence inactivated metal ion degradants must also be capable of regeneration to their active, uncomplexed form during the electrochemical phase. That is to say, instead of or in addition to the foregoing redox couples, soluble inert metal ions such as $Co^{+2}$, $Cr^{+2}$, $Ni^{+2}$, $Ag^+$, $Pd^{+2}$, etc. may be added to the scrubber liquid-electrolyte solution to aid in solubilization of specific kinds of toxic substances which are readily complexed. For example, $Cu^{2+}$ has excellent complexing properties for ammonia and amines, thereby greatly assisting solubilization of these pollutants for destruction in the electrolyzer zone. Likewise, $Cu^{+2}$ is capable of performing effectively in the presence of $Cr^{+6}$ of the $Cr^{+6}/Cr^{+3}$ redox couple. Other metal complexing ions are also useful in the methods of this invention for their catalytic effect, eg $Ag^+$ in combination with chrome redox couple is also useful in promoting the regeneration of $Cr^{+6}$. Another example is complexation of cyanide by iron or silver. While chemical degradation may not occur in some of these cases in the electrolyte solutions, these contaminants are irreversibly removed or eventually degraded by oxidation at the anode with regeneration of the metal ion.

To be most effective, redox couples and metal ion complexing salts are used in aqueous media of appropriate pH, in presence of suitable anions and cations such that the rates of solubilization or reaction with the contaminant as well as regeneration of the oxidized active form of the redox couple at the anode are maximized. For example, redox couples based upon chromium, cerium and vanadium are most active, stable and readily regeneratable at acidic pH's, whereas permanganate is best generated and employed in alkaline medium. Anions such as sulfate, phosphate and nitrate, as well as cations, such as protons and alkali metal ions like $Na^+$, $K^+$, $Li^+$ are stable to the process conditions. In contrast, anions such as organic carboxylates, like formate or acetate, and cations like ammonium or alkylammonium may be unstable and may tend to degrade. Those skilled in the art can readily discern the appropriate stabilizing conditions for a given redox couple. The preferred concentration of soluble regeneratable redox couples and complexing agents is in the range of about 0.0001M to the limit of solubility. The operating temperature of the aqueous electrolyte solution is largely dictated by the temperature of air requiring purification; however, heating of the aqueous electrolyte above ambient temperatures can be readily achieved, if needed, by employing a suitable heater in the air purification system. Likewise, cooling of the aqueous electrolyte may be required in instances where the contaminated air is a hot air stream.

In addition to one or more redox couples and inorganic complexing agents the aqueous scrubber liquid-electrolyte should have sufficient ionic constituents to provide for ionic conductivity in the electrochemical cell. The ionic conductivity may be adequately supplied by the redox couple or complexing metal ions, or the conductivity may be enhanced by addition of compatible electrolytes, such as $H_2SO_4$, $Na_2SO_4$, $NaHSO_4$, $NaH_2PO_4$, $HClO_4$, $NaClO_4$, $HNO_3$, $HBF_4$, $NaBF_4$, as well as others. Here, the choice of the electrolyte is largely dictated by such factors as the desired electrolyte solution pH; stability and reactivity of the redox couples; stability and electrocatalytic activity of the electrodes. In addition to the above constituents, the aqueous electrolyte may contain other ionic constituents such as silver, cobalt and bromide ion which help to catalyze electrochemical regeneration of some redox couples and increase the rate of degradation of some contaminants respectively. Halide ions such as chloride, bromide and iodide may be present, but only at low non-halogenating concentrations.

Performance of the process can be enhanced further by the addition of a pollutant solubilizing agent to the scrubber liquid-electrolyte. This is especially advantageous when the air being treated contains hydrocarbons and other organic compounds which are essentially insoluble and/or not readily absorbed by the aqueous scrubber liquid-electrolyte. That is to say, in order for the air purification process to perform effectively with maximum efficiency in removing pollutants and toxic substances from air, such substances should be readily solubilized in the scrubber zone. However, organic compounds in general, and aromatic hydrocarbons like benzene and toluene in particular are not readily removed from air in the scrubber zone by the aqueous scrubber liquid-electrolyte alone. Accordingly, it was found that this problem can be largely remedied by incorporating a "pollutant solubilizing agent" into the scrubber liquid-electrolyte to enhance solubilization.

Pollutant solubilizing agent is intended to include the following classes of materials: surfactants, nonpolar solvents and hydrocarbon oils and adsorption agents. Virtually any surfactant may be employed provided it is at least partially soluble in the scrubber liquid-electrolyte, has solubility for the pollutant, and is stable to electrolysis and chemical reactions, like oxidation reactions. Suitable surfactants include members from all categories of surface active agents, including cationic, anionic, nonionic and amphoteric types. Representative anionic surfactants typically include the sulfonic acid types, like dodecylbenzene-sulfonic acid; phosphonic acid types, like long chain hydrocarbon phosphonic acids; carboxylic acid types, such as perfluoroheptanoic acids and fluorocarbon type surfactants, such as those available from DuPont under the registered trademark Zonyl. Zonyl brand surfactants as a class of materials have perfluorohydrocarbon moieties with polar end groups. Zonyl FSC cationic type surfactant is a quaternary ammonium type. Other suitable cationic type surfactants also include quaternary ammonium salts like cetyltrimethylammonium sulfate, as well as saturated aliphatic types like $(CH_3)_4NBr$, $(C_4H_9)_4NBF_4$ and $(C_6H_{11})_4NClO_4$. Fluorocarbon type surfactants as a class are particularly preferred because of their generally high degree of stability to chemical and electrochemical reactions.

Zonyl UR and FSP brand perfluorocarbon surface active agents with phosphonate end groups and Zonyl TBS with sulfonic acid end groups are further examples of the anionic type. Representative nonionic type surfactants include Zonyl FSN which has perfluorohydrocarbon chains linked to polyethylene oxide groups. Suitable amphoteric type surface active agents would consist of tetrabutylammonium perfluoroheptanoate and Zonyl FSK type surfactants which consists of quaternary ammonium and carboxylic acid perfluorohydrocarbon type surfactants. The surfactants need only be employed in amounts sufficient to help solubilize the pollutants and improve absorption of potentially toxic substances by the scrubber liquid-electrolyte. This means adding at least 0.001 percent by weight to the scrubber liquid. In the case of the fluorinated surfactants, this would include amounts ranging generally from about 0.001 to about 0.1 percent by weight.

Useful pollutant solubilizing agents which in their own right are insoluble in the aqueous liquid-electrolyte are nonpolar solvents and especially oils, such as hydrocarbon oils which are nonvolatile and stable to chemical and electrochemical attack, and capable of forming an insoluble phase with the aqueous scrubber solution. This may include higher boiling point saturated hydrocarbons and perfluorocarbons with boiling points greater than 200° C. or higher. Alternatives may include saturated hydrocarbon oils alone or in combination with the above surfactants. Representative examples would consist of detergent based oils, such as motor oils having detergent type additives.

A further class of materials intended within the meaning of "pollutant solubilizing agent" would be solid adsorbents which would function as high surface area packings for the wet scrubber zone. This would consist of such members as stable microporous polymer beads comprised of styrene-divinylbenzene copolymer, polyvinylchloride, and high surface area carbons like carbon felts, cloths and foams. The adsorbents appear to provide adsorption equilibrium sites in the scrubber liquid-electrolyte removing any excess pollutant from the air allowing the pollutant to react as it desorbs with electrochemically regeneratable degradant in solution and permitting adsorption of additional pollutant.

As before mentioned, the electrochemical reactor of the air purification apparatus comprises an anode, a cathode, and an aqueous electrolyte. In addition, an inert separator or ion-exchange membrane may be required in the cell to minimize conversion at the cathode, of the active form of the redox couple to the inactive form. To power the electrochemical cell, a suitable DC power supply or pulsed power supply may be used which may comprise batteries for smaller portable applications such as gas masks and environmental suits, or even fuel cells for larger applications, where portability is still important. Suitable anode materials comprise inert electronically conductive materials such as Pt, $PbO_2$ on Pb, graphite or Ti, $RuO_2$ on Ti, Pt/Ir on Ti, $IrO_2$ on Ti, AgO on Ag, $SnO_2$ on Ti, nickel (III) oxide on Ni, Au, $Ti_4O_7$ (Ebonex$^R$), $PbO_2$ on $Ti_4O_7$, $Fe_3O_4$ on Ti, graphite, vitreous carbon and especially at high pH's, steel or nickel and various alloys thereof. The choice of the appropriate anode material is made by considering such factors as cost, stability of the anode material in the aqueous scrubber liquid-electrolyte solution and its electrocatalytic properties for achieving high efficiencies in conversion of redox couples to the active forms, as well as in degrading residual and persistent contaminants in the aqueous electrolyte solution. Where electrocatalytic metal oxides such as $PbO_2$, $RuO_2$, $IrO_2$, $SnO_2$, AgO, $Ti_4O_7$ and others are used as anodes, doping such oxides with various cations or anions, has been found to further increase electrocatalytic oxidation behavior, stability, or conductivity. In contrast, the choice of cathode material is broader and includes metals, such as lead, silver, steel, nickel, copper, platinum, zinc, tin, etc. as well as carbon, graphite, $Ti_4O_7$ and gas diffusion electrodes as described above. The electrode material, whether anode and/or cathode may be of either low or high surface area. Higher surface area electrodes, such as for example metal or graphite beads, carbon felt, or reticulated vitreous carbon are especially useful in achieving higher efficiencies for electrochemical conversion of redox couples or destruction of toxic or hazardous substances when these are present at low concentration in the aqueous electrolyte.

As a further and especially preferred embodiment of the invention separators and membranes can be omitted from the electrochemical cell of the electrolyzer zone. As previously noted, porous separators and permselective ion exchange membranes have been employed in electrochemical cells used for separating anolyte and catholyte compartments. In the case of redox couples in the chemical destruction of pollutants the lower valence ions (inactive state) after reacting with the pollutant need to be reactivated to their higher valence state at the working anode. However, in the absence of a cell membrane or separator a high percentage of the reactivated higher valence state ions in the anolyte will migrate to the catholyte and be reduced back to their inactive lower valence state at the cathode. Such a competing reaction makes the process highly inefficient. In an effort to overcome this problem, U.S. Pat. No. 3,793,171 suggests restraining the competing reaction by making the surface area of the anode 20 times larger than the cathode. This solution, however, creates other problems, such as more complicated and costly cell designs because the anode is substantially larger than the cathode.

Accordingly, the present invention is a surprising and unexpected improvement in the electrochemical cell for the electrolyzer zone of the air purification process. A membrane or separator is no longer required to avoid competing reactions at the non-working cathode, and the process can also be practiced without trade offs in terms of higher capital costs to accommodate cathodes of reduced surface area. The invention is based on the discovery that cathodes comprised of a substoichiometric titanium oxide do not have a sufficiently high overpotential to reduce a significant percent of the higher valence (active form) redox couples to lower valence state ions (inactive form) compared to the overpotential for other processes like hydrogen evolution. It was discovered the substoichiometric titanium oxides surprisingly are poor electrocatalysts for reduction of these redox oxidants This is especially unexpected in light of the disclosure of U.S. Pat. No. 4,422,917 (Hayfield), which teaches several applications for electrodes containing substoichiometric titanium oxides.

It was discovered, that by utilizing a cathode as the non-working counter electrode comprising in particular a Magneli phase substoichiometric titanium oxide having the formula $TiO_x$ wherein x ranges from about 1.67 to about 1.9, hydrogen is preferentially generated at the cathode and the reduction of redox couples to their lower inactive valence state is minimized. A preferred specie of the substoichiometric titanium oxides is $Ti_4O_7$. Hence, it has been found that undivided electrochemical cells can be used in the electrolyzer zone in the air purification process with minimal undesired competing reactions occurring at the cathode. In addition to the foregoing advantages with these cathodes there is little problem of metal from the redox couple, e.g. iron, plating out on the cathode to foul performance which otherwise would be expected to occur with more conventional cathodes.

The Magneli phase titanium oxides and methods of manufacture are described in U.S. Pat. No. 4,422,917 (Hayfield) which teachings are incorporated-by-reference herein. The titanium oxides are also commercially available under the registered trademark Ebonex. Hayfield suggests their use in electrodes for certain electrochemical applications Column 13, lines 27–32 specifically teach that anodes of such titanium oxides coated with specified metals "may be satisfactory for use in redox reactions such as the oxidation of manganese, cerium, chromium and for use as products in the oxidation of organic intermediates". Hayfield does not teach application of Magneli phase titanium oxides as nonworking cathodes alone.

Optionally, the electrodes and in particular the cathodes comprising Magneli phase titanium oxides may contain a dopant compound, such as tantalum oxide, tungsten oxide and nickel oxide etc. added to the electrodes to increase their electrical conductivity, mechanical stability and resistance to corrosion. Such dopants are suitable for lowering the overpotential for hydrogen evolution and increase the overpotential for reduction of redox couples which will further minimize unwanted competing reactions at the cathode. Dopant is added in an amount ranging from about 0.0001 to about 1 percent by-weight.

Alternatively, the cells, in some instances, may be operated successfully in an undivided or non-compartmented configuration, in those cases where the active form of the redox couple is not efficiently inactivated at the cathode because of the type of pollutant present. Operation in an undivided, non-compartmented mode is also particularly appropriate for degradation of the more unreactive halocarbon type contaminants such as chloroform, trichlorethylene, polychlorinated biphenyls, dioxin and the like, since degradation will largely occur at the cathode by reductive dehalogenation. Noncompartmented cell design is also appropriate when the cell comprises an air depolarized cathode and contaminated air is contacted with the non-wetted side of such porous cathodes. In this instance the cathode itself becomes the wet scrubber described previously.

The electrochemical cells of the present invention may be monopolar or bipolar in design and may include designs such as packed bed, fluidized bed, capillary gap and zero gap, depending largely on the application for which the air purification apparatus is intended. For reasons previously stated, undivided electrochemical cells are most preferred, but when more conventional electrodes are employed the cells may contain a suitable inert microporous separator or ion-exchange membrane, separating anode and cathode compartments, thereby preventing the active form of the redox couple from being reduced at the cathode. A broad range of inert materials are commercially available based on microporous thin films of polyethylene, polypropylene, polyvinylidenedifluoride, polyvinylchloride, polytetrafluoroethylene and the like, as well as anionic and cationic type membranes manufactured by such companies as RAI under the trademark of Raipore, by DuPont under the trademark of Nafion, as well as by Tosoh and others.

The scrubber system may optionally comprise a "dry" prefilter zone consisting of an electrostatic precipitator or a woven or porous material of the kind employed in conventional heating, air-conditioning and air-handling systems for physical removal of large airborne particles, such as flyash, carbon black, pollen, asbestos and the like. Such a prefilter is especially important when employing hollow fiber-type scrubbers to prevent blockages of the hollow fiber air inlet openings.

As a further option the air purification system may have a "dry" scrubber or prescrubber zone located between the optional prefilter and wet scrubber zones, as shown in the drawing. The dry scrubber is especially useful in the preadsorption of pollutants and is adapted to respond to large surges or spikes of pollutants in the environment which if not removed before entering the wet scrubber zone would otherwise exceed the normal operating capacity of the system. Hence, the dry prescrubber is an especially useful and economic means for expanding the capacity of the air purification system for handling large sudden releases of pollutants into the environment, but without other major additional capital costs such as a larger electrochemical cell, power supply or solution reservoir.

The dry scrubber zone is useful in reversibly adsorbing larger releases of airborne toxic or hazardous substances and for slowly releasing these to the wet scrubber for decontamination. Generally, all toxic substances have sufficient solubility in the aqueous electrolyte at the relatively low levels in which they may be present in air (often less than 1000 ppm); however, some substances have very low solubility in aqueous media. Therefore, the dry scrubber is particularly useful for low solubility substances such as nonpolar aromatic hydrocarbons and halocarbons. Suitable packings for the dry scrubber zone comprise various kinds of activated carbons, silica gel and alumina as well as polymer beads, especially microporous polymer beads of such polymers as divinylbenzine styrene copolymer, polyvinylbenzene, polystyrene, and polyvinylchloride.

Since the purified air emerging from the wet scrubber may be of high humidity and have traces of aqueous electrolyte, the scrubber system also provides for an optional "post" scrubber zone, which may include a final wash with water, a demister to remove aerosol-type water particles and/or a dehumidifier to lower the humidity of the exiting purified air.

In addition to gas masks and environmental suits previously described, the air purification systems of this invention, both integral and nonintegral, are readily adaptable to heating and cooling systems of residential and nonresidential buildings. For instance, air circulation ducts of a forced air heating system of a hospital or other large building can be equipped with such an air purifier, so that heated air returning to rooms will be free of pollutants. Individual room humidifiers for the house for adding moisture to the air can also be equipped with the air treatment systems of this invention. Such air purification systems can also be integrated into forced air heating and cooling systems for homes, factories, office buildings, schools and the like.

The following specific examples demonstrate the various aspects of this invention, however, it is to be understood that these examples are for illustrative purposes only and do not purport to be wholly definitive as to conditions and scope.

EXAMPLE 1

An air purifying apparatus was assembled using a commercially available plate-and-frame electrochemical cell, the MP Cell, manufactured by ElectroCell AB of Sweden. The cell consisted of a lead dioxide on lead anode (0.01 $m^2$ in area), DuPont Nafion$^R$ 324 cation exchange membrane, and a lead cathode (0.01 $m^2$ in area). The cell was connected to a DC power supply which also had attached an ammeter, voltmeter and coulometer for following the charge passed. The aqueous electrolyte of the anolyte consisted of 3 liters of 0.1M chromic acid dissolved in 3M sulfuric acid in water, and the catholyte, 3 liters of 3M aqueous sulfuric acid. The anolyte was continuously circulated by means of a March Pump (Model TE-MDX-MT-3) to the scrubber, while the catholyte was likewise continuously circulated to a reservoir. Two all-plastic flow meters were situated in these separate electrolyte streams, and by means of valves, the flow rate on each stream was adjusted to be approximately equal and about 4 liters/min. The scrubber consisted of a 3 liter cylindrical tower constructed of glass, which was partially filled with glass beads to provide a high surface contact area, and which was fitted with a thermometer and a potentiometric measurement device for monitoring the dichromate concentration level. This latter device comprised a Pt wire electrode, saturated calomel reference electrode and a high impedance digital multimeter, with the two electrodes immersed in the circulating solution The scrubber also had provisions for introducing a contaminated air stream and for taking samples for analysis of the purified air.

This air purifying apparatus was operated for the destruction of a test contaminant sample, which when totally dissolved in the anolyte contained 0 03M benzyl alcohol and 0.05M ethylene glycol A DC current of 2 to 2.5A was allowed to pass through the cell, and after a total of 23,400 coulombs had been passed, it was determined by gas chromatographic analysis that none of these contaminants remained in solution. The charge required to regenerate the active $Cr^{+6}$ redox agent from the inactive $Cr^{+3}$ form was 166,600 coulombs indicating that the system had converted the contaminants to lower molecular weight products, including $CO_2$. In a comparison control experiment, in which the anolyte contained no redox couple, requiring destruction to occur by anodic oxidation alone, a total of 46,000 coulombs was required for destruction of these contaminants, compared to 23,400 coulombs with the redox couple present. This demonstrates the greater effectiveness of an air purification process which combines scrubbing with electrolyzing using an aqueous scrubber liquid-electrolyte containing a redox couple degradant.

EXAMPLE 2

The wet scrubber of Example 1 was replaced with a polymer tube packed with bundles of microporous hollow fibers, manufactured of polypropylene and constructed such that contaminated air could be passed through the interior of the hollow fibers, while the aqueous anolyte was continuously pumped over the exterior of these fibers. The air flow was typically about 600 ml/min and contained from 40 to 400 ppm of contaminant Using the method of Example 1, the destructive removal from air of the following contaminants was demonstrated, (the percentage of contaminant removed from air in one pass is noted in parenthesis): formaldehyde (85%); ethylene oxide (100%); sulfur dioxide (100); nitrogen dioxide (88%).

EXAMPLE 3

The electrochemical cell of Example 1 is fitted with a $PbO_2$ on Ti anode and a carbon-based gas diffusion electrode, consisting of Vulcan XC-72 carbon and Teflon$^R$ fibers, as manufactured by Prototech Co (Newton, MA), as Model No. PCC. No membrane or separator is employed in this cell. An air stream contaminated with hydrogen sulfide is caused to pass over the non-wetted side of the gas diffusion electrode, while a solution of ferric sulfate in aqueous sulfuric acid is circulated by means of a pump through the cell. The exiting air is purified as current flows through the electrochemical cell, thereby demonstrating the wet scrubber as an integral part of the electrochemical reactor.

EXAMPLE 4

The air purifying apparatus of Example 1 is fitted with a dry scrubber tower, such that contaminated air containing a nonpolar aromatic hydrocarbon is caused to pass first through the dry scrubber and then into the wet scrubber of the scrubber system The dry scrubber packing consists of activated carbon, activated carbon mixed with microporous polymer beads of divinyl benzene styrene copolymer, or the copolymer beads alone Operation of the air purification system, with passage of current demonstrated destructive removal of the contaminant.

EXAMPLE 5

Part A

A portable electrochemically-based air purifier is assembled into a gas mask, capable of removal and destruction of a broad spectrum of toxic chemical and pathogenic substances. A conventional gas mask powered by a portable battery pack and equipped with an electrical circulating system, is modified by incorporation into the air intake portion a dry scrubber element comprising activated carbon through which the air is initially drawn, followed by a wet scrubber unit incorporating microporous hollow fibers through which an aqueous electrolyte is circulated from a small electrochemical cell powered by the abovementioned battery pack. The circulating aqueous electrolyte consists of an acid solution as anolyte containing the couples $Cr^{+6}/Cr^{+3}$, with $Ce^{+4}/Ce^{+3}$ and additives of $Cu^{2+}$ as a complexing agent degradant and Ag as a catalyst. The electrochemical cell comprises a $PbO_2$ on Pb anode, a DuPont Nafion$^R$ membrane, and an air-depolarized gas diffusion cathode in contact with a non-circulating reservoir of an aqueous electrolyte solution as catholyte. Current inefficiencies will lead to oxygen evolution by electrolysis of water. However, this is desirable especially when used with a gas mask, in which the oxygen can be utilized as a source of supplemental life supporting oxygen for inhalation.

Part B

The effective destruction of microorganisms in the aqueous electrolyte is demonstrated for Echovirus, Adenovirus, Rhinovirus, Influenza virus, *Legionella Pneumophila, Staphylococcus Aureus, Streptococcus Pyogenes,* and *Streptococcus Phenumoniae*. Total kill is observed by contacting the microorganisms with aqueous 3M $HSO_4$ containing 0.1M $CrO_3$ in the gas mask of Part A.

EXAMPLE 6

Oxidation of several organic substances by either excess $Cr^{+6}$ a or $Ce^{+4}$ degradant solutions alone were found to be very slow or not to occur at all at ambient temperatures, even after 5 to 7 days For example, dimethylsulfone was found to be unreactive to either of these degradants alone; however, the combination of degradants oxidized dimethylsulfone to the extent of 11% toward total oxidation. Likewise acetone with excess $Cr^{+6}$ could only be taken to 3% of conversion and with excess $Ce^{+4}$ to 21%; however, acetone with a combination of excess degradants oxidized acetone to the extent of 43% toward total conversion to $CO_2$. The above results were determined by comparing the number of equivalents of degradants consumed after the reaction time, titrimetrically, with the theoretical number of equivalents required to achieve complete oxidation toward $CO_2$. These experiments demonstrate that a combination of degradants can be more efffective both in the rate and on the extent of oxidation.

EXAMPLE 7

An aqueous scrubber solution comprising cupric salt is employed to scrub air contaminated with ethylenediamine. The solubilized and complexed pollutant-containing solution is oxidized at a $PbO_2$ anode using the cell of Example 1, causing destruction of the pollutant at the anode and regeneration of the degradant to its active uncomplexed state, for further use in the chemical phase.

EXAMPLE 8

Studies were performed to demonstrate the beneficial effect of combinations of redox couples towards enhancing the destruction of pollutants. The studies were performed by preparing a scrubber liquid-electrolyte comprising 300 ml of a 3M aqueous sulfuric acid solution, and that for purposes of maintaining effective controls for the destruction studies the electrochemical cell was eliminated from the circuit since otherwise the results could become distorted due to electrochemical oxidation of pollutant also taking place That is, with the scrubber liquid-electrolyte also circulating through an electrochemical cell it would be difficult to ascertain if the pollutant was being destroyed exclusively by a chemical oxidation mechanism, or also by electrochemical oxidation at the anode of the cell. Hence, controlled amounts of pollutant were incorporated into the scrubber liquid-electrolyte. The relative rate or extent of destruction of the pollutant was determined by measuring the consumption of the degradant A measured excess of degradant was added and allowed to react without agitation for 24 hours. The extent to which destruction occurred was determined by potentiometrically titrating the excess unreacted degradant with standardized ferrous ammonium sulfate dissolved in 1M sulfuric acid using platinum and calomel electrodes. The destruction data generated though the studies was as shown in the TABLE below:

TABLE

| | COMPARISON OF DESTRUCTION OF POLLUTANTS BY DEGRADANTS | | | | | | |
|---|---|---|---|---|---|---|---|
| | EXTENT OF OXIDATION AND DESTRUCTION OF POLLUTANTS BY DEGRADANTS (e$^-$/mole) | | | | | | |
| POLLUTANTS | 0.1N Cr(VI) | 0.1N Ce(IV) | 0.05N Cr(VI), 0.05N Ce(IV) | 0.01N NaBr | 0.1N Cr(VI), 0.01N NaBr | 0.1N Ce(IV), 0.01N NaBr | 0.05N Cr(VI), 0.05N Ce(IV), 0.01N NaBr |
| ACETIC ACID | 0 | 0 | 0 | 0 | 1.0 | 0.5 | 1.0 |
| (conc. mM) | (6.6) | (6.6) | (6.6) | (7.6) | (7.3) | (7.6) | (7.6) |
| DIETHYLCYANO- | 0 | 0 | 0 | 0 | 1.6 | 1.9 | 3.6 |
| PHOSPHONATE | (2.6) | (2.3) | (2.6) | (2.3) | (2.6) | (2.3) | (2.3) |
| (CONC. mM) | | | | | | | |
| DIMETHYL- | 2.0 | 0 | 3.0 | 0 | 3.7 | 3.0 | 3.5 |
| SULFOXIDE | (5.0) | (3.3) | (4.0) | (4.0) | (3.0) | (4.0) | (4.0) |
| (DMSO) | | | | | | | |
| (conc. mM) | | | | | | | |
| GLYCINE | 0 | 0 | 0 | 0 | 0 | 0 | 0.6 |
| (conc. mM) | (4.3) | (3.3) | (4.0) | (3.3) | (3.3) | (3.3) | (3.3) |
| METHYLETHYL | 0 | 5.3 | 6.9 | 0 | 6.0 | 6.7 | 6.4 |
| KETONE | (2.3) | (2.6) | (2.6) | (2.6) | (2.6) | (2.6) | (2.6) |
| (conc. mM) | | | | | | | |
| PHENOL | 17.0 | 9.0 | 20.0 | 0 | 18.0 | 8.3 | 13.0 |

TABLE-continued

COMPARISON OF DESTRUCTION OF POLLUTANTS BY DEGRADANTS

EXTENT OF OXIDATION AND DESTRUCTION OF POLLUTANTS BY DEGRADANTS ($e^-$/mole)

| POLLUTANTS | 0.1N Cr(VI) | 0.1N Ce(IV) | 0.05N Cr(VI), 0.05N Ce(IV) | 0.01N NaBr | 0.1N Cr(VI), 0.01N NaBr | 0.1N Ce(IV), 0.01N NaBr | 0.05N Cr(VI), 0.05N Ce(IV), 0.01N NaBr |
|---|---|---|---|---|---|---|---|
| (conc. mM) | (1.6) | (1.6) | (2.0) | (2.0) | (1.6) | (2.0) | (2.0) |

EXAMPLE 9

For purposes of demonstrating the effect of pollutant solubilizing agent on the performance of the air purification process for poorly water soluble or insoluble pollutants the following experiment was conducted. 100 ml of 0.1 molar ceric sulfate was added to a 3 molar aqueous sulfuric acid solution and this was magnetically stirred at 55° C. Surfactants in various concentrations were added to the above solutions. The surfactants was an anionic type available from 3M Company under the designation FC-99 and which is a perfluoroalkyl sulfonate. Pollutants with concentrations of surfactant added are provided in the table below. After reacting for two hours the extend of oxidation was determined by analyzing the remaining $Ce^{+4}$ in solution, titrimetrically.

TABLE

| Pollutant (millimoles) | Surfactant (%) | $e^-$/mole |
|---|---|---|
| None (Control) | 0.10 | 0 |
| Toluene (2.0) | None | 0 |
| Toluene (2.1) | 0.10 | 12 |
| p-xylene (1.8) | None | 1.6 |
| p-xylene (1.9) | 0.10 | 3.1 |

The data in the table shows that toluene and p-xylene had no or relatively poor levels of destruction in those experiments performed without surfactants, and correspondingly enhanced destruction when surfactant was added to the scrubber solution.

EXAMPLE 10

The electrochemical cell of Example 1 is fitted with a solid cathode comprising substoichiometric titanium oxides obtained from Ebonex Technologies, Inc. The material employed was labeled with the Ebonex trade mark In conducting the experiment the cation exchange membrane is removed for undivided cell operation. Likewise, one solution pump, a single scrubbing solution reservoir containing 0.1M cerium sulfate in 3M $H_2SO_4$, and one flowmeter are required, thereby simplifying the air purification system and lowering the resultant capital cost. In operation it is found that the electrochemical cell performs at a lower cell voltage than with the ion exchange membrane and $Ce^{+4}$ is regenerated from $Ce^{+3}$ at a current efficiency greater than 50%.

While the invention has been described in conjunction with specific examples thereof, this is illustrative only. Accordingly, many alternatives, modifications and variations will be apparent to persons skilled in the art in light of the foregoing description, and it is, therefore, intended to embrace all such alternatives and modifications as to fall within the spirit and broad scope of the appended claims.

We claim:

1. A method for purification of air and destruction of pollutants therein in which comprises the steps of:
   (a) providing an air purification system comprising a wet scrubber zone in combination with an electrolyzer zone, and an aqueous scrubber liquid-electrolyte circulating between said electrolyzer and scrubber zones comprising an electrochemically regeneratable degradant and a pollutant solubilizing agent;
   (b) cleaning polluted air by dissolving pollutants into said scrubber liquid-electrolyte and impressing a voltage across said electrochemical cell;
   (c) converting said pollutants in said scrubber liquid-electrolyte to substances of lesser toxicity or hazard, and
   (d) reactivating said electrochemically regeneratable degradant in said scrubber liquid-electrolyte for further cleaning of polluted air.

2. The method of claim 1 wherein said pollutant solubilizing agent is a surfactant which is at least partially soluble in said scrubber liquid-electrolyte and stable to electrolysis and chemical oxidation reactions.

3. The method of claim 1 wherein said pollutant solubilizing agent is a member selected from the group consisting of a nonpolar solvent, a hydrocarbon oil and a solid adsorbent.

4. The method of claim 1 wherein said air purification system includes a dry scrubber zone preceding the wet scrubber zone for removal of surges of pollutants.

5. The method of claim 2 wherein said electrochemically regeneratable degradant is a member selected from the group consisting of a redox couple, a complexing metal ion and mixtures thereof.

6. The method of claim 3 wherein said electrochemically regeneratable degradant is a member selected from the group consisting of a redox couple, a complexing metal ion and mixtures thereof.

7. The method of claim 5 wherein the surfactant is a fluorinated hydrocarbon type.

8. The method of claim 1 wherein said regeneratable degradant in said scrubber liquid-electrolyte is $Ag^{+-2}/Ag^+$ and the scrubber liquid-electrolyte comprises a mineral acid.

9. The method of claim 8 wherein said acid-containing electrolyte is $HNO_3$.

10. A method for purification of air and destruction of pollutants therein which comprises the steps of:
    (a) providing an air purification system comprising a scrubber zone in combination with an electrolyzer zone, and a scrubber liquid-electrolyte circulating between said electrolyzer and scrubber zones comprising an electrochemically regeneratable degradant, said electrolyzer zone comprising an undivided electrochemical cell having an anode as a working electrode and a cathode comprising a substoichiometric titanium oxide as a counter electrode, said counter electrode preferentially generating hydrogen while minimizing reduction of said electrochemically regeneratable degradant, said electrodes being spaced from one another;

(b) cleaning polluted air by dissolving pollutants into said scrubber liquid-electrolyte and impressing a voltage across said electrochemical cell;

(c) converting said pollutants in said scrubber liquid to substances of lesser toxicity or hazard, and (d) reactivating said electrochemically regeneratable degradant in said scrubber liquid-electrolyte for further cleaning of polluted air.

11. The method of claim 10 wherein said substoichiometric titanium oxide present in said cathode has the formula $TiO_x$, where x ranges from about 1.67 to about 1.9.

12. The method of claim 10 wherein said cathode comprises a Magneli phase substoichiometric titanium oxide present in the form of $Ti_4O_7$.

13. The method of claim 11 wherein said cathode comprises a dopant.

14. The method of claim 10 wherein said regeneratable degradant in said scrubber liquid-electrolyte comprises a member selected from the group consisting of a redox couple, a complexing metal ion and mixtures thereof.

15. The method of claim 10 wherein said regeneratable degradant in said scrubber liquid-electrolyte comprises a redox couple selected from the group consisting of $Co^{+3}/Co^{+2}$; $Cr^{+6}/Cr^{+3}$; $Ce^{+4}/Ce^{+3}$; $Fe(CN)_6^{-3}/Fe(CN)_6^{-4}$; $Fe^{+3}/Fe^{+2}$; $Mn^{+3}/Mn^{+2}$; $Pb^{+4}/Pb^{+2}$; $VO^+/VO^{+2}$; $MnO_4^-/MnO_2$; $Ag^{+2}/Ag^+$; $S_2O_8^{-2}/SO_4^{-2}$, nonhalogenating concentrations of halide ion and mixtures thereof.

16. The method of claim 10 wherein said regeneratable degradant in said scrubber liquid-electrolyte is $Ag^{+2}/Ag^+$ and the scrubber liquid-electrolyte comprises a mineral acid.

17. The method of claim 16 wherein said acid in the electrolyte is $HNO_3$.

18. The method of claim 15 wherein said scrubber liquid-electrolyte also includes a complexing metal ion selected from the group consisting of $Co^{+2}$, $Cu^{+2}$, $Ni^{+2}$, $Ag^+$, and $Pd^{+2}$.

19. The method of claim 10 wherein said scrubber zone comprises a gas diffusion electrode positioned in the electrolyzer zone.

20. A method for purification of air and destruction of pollutants therein which comprises the steps of:

(a) providing an air purification system comprising a scrubber zone in combination with an electrolyzer zone, and a scrubber liquid-electrolyte circulating between said electrolyzer and scrubber zones comprising performance enhancing combinations of more than one redox couple selected from the group consisting of $Co^{+3}/Co^{+2}$; $Cr^{+6}/Cr^{+3}$; $Ce^{+4}/Ce^{+3}$; $Fe(CN)_6^{-3}/Fe(CN)_6^{-4}$; $Fe^{+3}/Fe^{+2}$; $Mn^{+3}/Mn^{+2}$; $Pb^{+4}/Pb^{+2}$; $VO^+/VO^{+2}$; $MnO_4^-/MnO_2$; $Ag^{+2}/Ag^+$; $S_2O_8^{-2}/SO_4^{-2}$ and nonhalogenating concentrations of halide ion, said electrolyzer zone comprising an anode and a cathode spaced from one another;

(b) cleaning polluted air by dissolving pollutants in said scrubber liquid-electrolyte;

(c) reacting said redox couples and pollutants in said scrubber liquid-electrolyte to form substances of lesser toxicity or hazard and spent redox couples;

(d) reactivating said spent redox couples in said scrubber liquid-electrolyte in said electrolyzer zone to form reactivated scrubber liquid-electrolyte, and (e) returning said reactivated scrubber liquid-electrolyte to said scrubber zone for further cleaning of polluted air.

21. The method of claim 20 wherein said electrolyzer zone comprises an undivided electrochemical cell having an anode as a working electrode and a cathode comprising a substoichiometric titanium oxide as a counter electrode.

22. The method of claim 20 wherein said scrubber zone and electrolyzer zone are integral with one another.

23. The method of claim 21 wherein the electrolyzer zone comprises a gas diffusion cathode.

24. The method of claim 23 wherein the gas diffusion cathode comprises a Magneli phase substoichiometric oxide of titanium.

25. A method for purification of air and destruction of pollutants therein which comprises the steps of:

(a) providing an air purification system comprising a scrubber zone in combination with an electrolyzer zone, and a scrubber liquid-electrolyte circulating between said electrolyzer and scrubber zones comprising at least one complexing metal ion lacking a higher oxidation state under process conditions, but capable of enhancing dissolution of said pollutants in said scrubber liquid-electrolyte when in a reactive state by forming a complex therewith;

(b) cleaning polluted air by dissolving pollutants in said scrubber liquid-electrolyte by forming complexes with said complexing metal ions;

(c) converting electrochemically said complexed pollutants in said scrubber liquid-electrolyte to substances of lesser toxicity or hazard in said electrolyzer zone while releasing said complexing metal ions back to said reactive state, and (d) said scrubber liquid-electrolyte comprising said complexing metal ions in a reactive state to said scrubber zone for further cleaning of pollutant air.

26. The method of claim 25 wherein said electrolyzer zone comprises an undivided electrochemical cell having an anode as a working electrode and a cathode comprising a substoichiometric oxide of titanium as a counter electrode.

27. The method of claim 25 including a redox couple selected from the group consisting of $Co^{+3}/Co^{+2}$; $Cr^{+6}/Cr^{+3}$; $Ce^{+4}/Ce^{+3}$; $Fe(CN)_6^{-3}/Fe(CN)_6^{-4}$; $Fe^{+3}/Fe^{+2}$; $Mn^{+3}/Mn^{+2}$; $Pb^{+4}/Pb^{+2}$; $VO^+/VO^{+2}$; $MnO_4^-/MnO_2$; $Ag^{+2}/Ag^+$; $S_2O_8^{-2}/SO_4^{-2}$, nonhalogenating concentrations of halide ion and mixtures thereof.

28. The method of claim 25 wherein the electrolyzer zone comprises a gas diffusion cathode.

* * * * *